Oct. 30, 1945.  S. A. HAVERSTICK  2,387,901
SLIP INDICATOR
Filed July 31, 1942
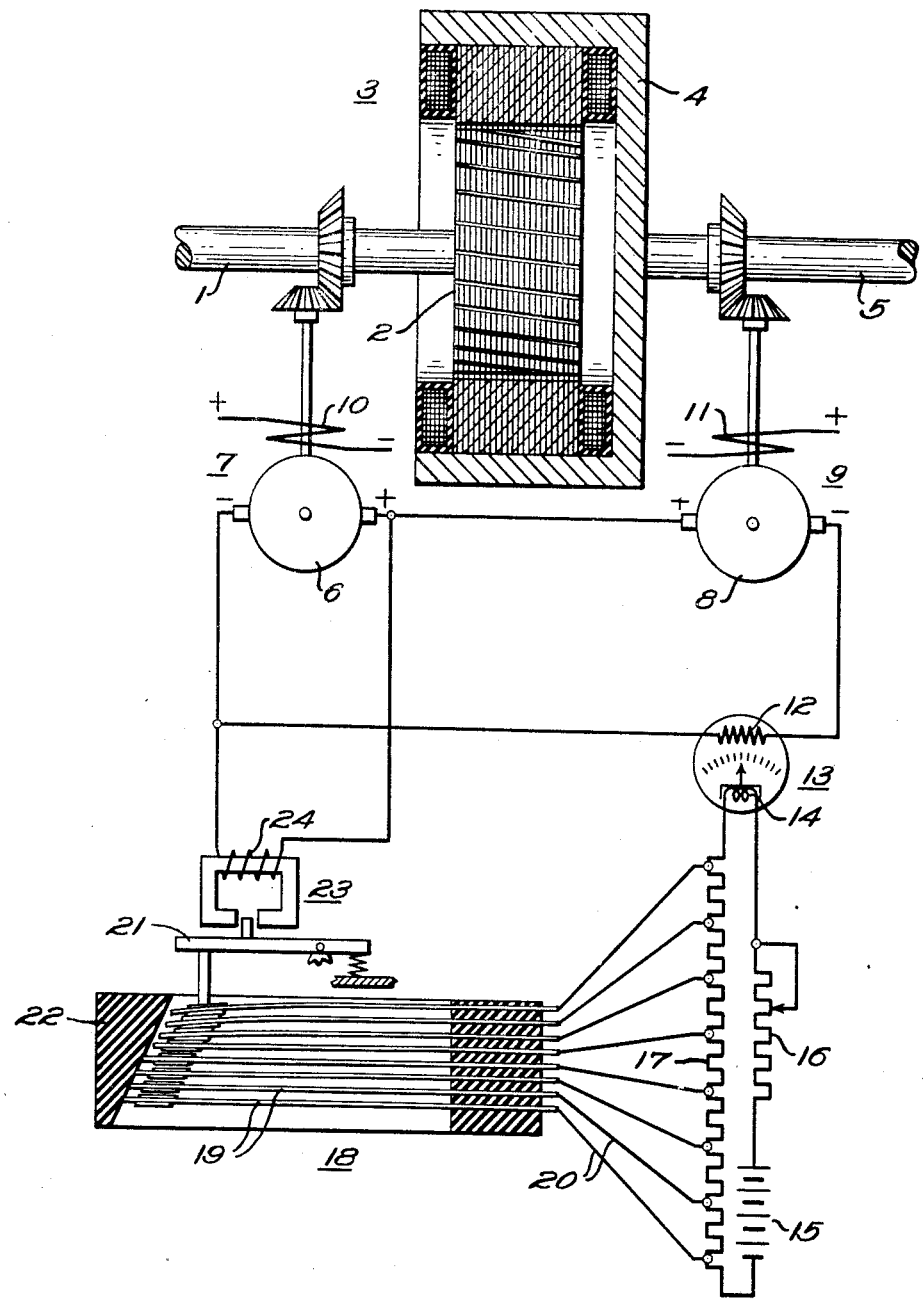
WITNESSES:
Robert C. Baird
Nw. C. Groome
INVENTOR
Samuel A. Haverstick.
BY
Paul E. Friedemann
ATTORNEY Patented Oct. 30, 1945

2,387,901

UNITED STATES PATENT OFFICE 2,387,901

SLIP INDICATOR

Samuel A. Haverstick, Wilkinsburg, Pa., assignor to Westinghouse Electric Corporation, East Pittsburgh, Pa., a corporation of Pennsylvania Application July 31, 1942, Serial No. 453,093

7 Claims. (Cl. 73—118)

My invention relates to apparatus for indicating variations in speed of one rotating shaft in relation to another rotating shaft.

My invention has general application but one rather useful application is the measurement of the slip of one element of a magnetic coupling in percent of the speed of the other element of the magnetic coupling.

During the present accelerated ship building program, many applications are being made of magnetic couplings in the main propulsion equipment of war and merchant ships. During the operation of such ships, it is important to know the slip of the portion, or element, of a magnetic coupling coupled to the propeller in relation to the operation of the element of the magnetic coupling coupled to the engine, or turbine.

One broad object of my invention is to simply and reliably indicate the speed of one shaft in relation to another shaft.

Another object is to electrically indicate the percent speed of one element of a magnetic coupling in relation to the other element of the same magnetic coupling.

Other objects and advantages will become readily apparent from a study of the following specification and the drawing accompanying it.

The single figure of the drawing illustrates somewhat diagrammtically one application of my invention.

In the drawing, I designates a shaft, connected at the left, to an engine, or turbine (not shown), and rigidly connected at the right to one element 2 of the electromagnetic coupling 3. The other element 4 of the magnetic coupling is, by means of shaft 5 and suitable gearing (not shown), connected to the ship propeller (also not shown).

With variations of torque and other operating characteristics, elements 2 and 4 of the coupling 3 slip with reference to each other. To determine this slip, I mechanically couple the rotor 6 of tachometer generator 7 to shaft I, as shown, and similarly mechanically couple the rotor 8 of tachometer generator 9 to shaft 5.

The two generators 7 and 9 are chosen to have identical and substantially straight line speed voltage characteristics. This means that for any selected like, or equal, speeds of the two shafts I and 5, the two voltages of the two generators will be equal.

The field windings 10 and 11 may be energized from a suitable constant potential source, or the fields may be permanent magnets. The voltages of the generators are thus directly proportional to their respective speeds.

Let $N_1$ = Speed of shaft I;
$N_5$ = Speed of shaft 5;
S = Slip of shaft 5 in relation to the speed of shaft I.

Then (1) $$S = \frac{N_1 - N_5}{N_1}$$

which is the percent slip of shaft 5 with reference to shaft I.

Since the voltages of the two generators, which voltages may be designated $V_7$ and $V_9$, respectively, are each directly proportional to the respective speeds of shafts I and 5 and follow the same straight line speed-voltage characteristic it may be said that $V_7 - V_9$ varies directly with, or is directly proportional to $N_1 - N_5$. This remains so regardless, or independent, of the actual speeds of the respective shafts.

To obtain this value of voltage difference, $V_7 - V_9$, I connect the two generators in series so that their voltages buck each other and in series with this series circuit I connect the voltage coil 12 of a conventional wattmeter 13. This coil 12 of the wattmeter is thus energized in proportion to $V_7 - V_9$.

To energize the current coil 14 of the wattmeter 13, I provide a source of constant potential direct current, as battery 15. This battery I connect in series with a calibrating resistor 16, the coil 14 of the wattmeter and a selected portion of the rheostat portion 17 of a voltage regulator 18 of the Silverstat type.

The Silverstat among other elements includes a plurality of blades 19 which are respectively connected at the right hand end to the leads 20. As the spring biased lever 21 moves clockwise, fewer blades contact each other at 22 and thus more resistance of the rheostat 17 is inserted in the circuit of coil 14, and the current in coil 14 decreases. However, when the lever 21 moves counterclockwise more blades 19 contact each other at 22 thus decreasing the resistance effect of rheostat 17 and the current in coil 14 increases. The lever 21 is actuated by an electromagnetic device 23 having the coil 24.

This coil 24 is connected to the terminals of generator 7 and is thus energized proportionally to the voltage $V_7$. A rise in voltage $V_7$ moves the lever 21 clockwise thereby decreasing the current in coil 14, whereas a decrease in $V_7$ moves the lever 21 counterclockwise thereby increasing the current.

The arrangement is thus such that $I_{14}$, the output current of the voltage regulator 18 that is flowing in coil 14, varies inversely with $V_7$, that is, $I_{14}$ varies as $$\frac{1}{V_7}$$

As is well known, the wattmeter reads volts times amperes, that is, $VI=(V_7-V_9)I_{14}$.
Then $$VI=(V_7-V_9)\frac{1}{V_7}=\frac{V_7-V_9}{V_7}.$$

Therefore VI, the wattmeter reading, if suitably calibrated=

$$\frac{N_1-N_5}{N_1}$$

From the foregoing it is apparent that I have provided a simple and reliable means for indicating the slip of one shaft with reference to another shaft.

I do not wish to be limited to the particular showing made but wish to be limited only by the scope of the claims hereto appended.

I claim as my invention:

1. In a slip indicator for indicating the speed of one shaft in relation to the speed of another shaft, in combination, a shaft, a second shaft, electric generating means for generating a voltage proportional to the speed of one shaft, second electric generating means, having the same speed voltage characteristics as the first electric generating means, for generating a voltage proportional to the speed of the other shaft, electromagnetic means for producing an effect proportional to the voltage difference of the two electric generating means, a source of current of a given voltage, means interconnected with the first electric generating means and the source of current for inversely varying the output voltage of the source of current with the voltage variations of the first electric generating means, electromagnetic means for producing an effect proportional to the output voltage of the source of current and indicating means for combining the effects of said electromagnetic means for thus indicating the slip of the second shaft with reference to the speed of the first shaft.

2. In a slip indicator for indicating the speed of one shaft in relation to the speed of another shaft, in combination, a shaft, a second shaft, a wattmeter having a voltage coil and a current coil, means for producing a voltage that is proportional to the difference in speed between the shafts but is substantially independent of the respective speeds of the shafts, means including a part of said first-named means for producing a voltage that is inversely proportional to the speed of one shaft, means for combining these two voltages in the wattmeter to thus indicate the slip speed of one shaft with reference to the speed of the other shaft.

3. In a slip indicator for indicating the difference in speed between two shafts in relation to the speed of one shaft, in combination, one shaft, a second shaft, a tachometer type generator coupled to one shaft and adapted to generate a voltage proportional to the speed of that shaft, a second tachometer type generator having speed-voltage characteristics exactly like the speed-voltage characteristics of the first tachometer generator, a watt-meter having a voltage coil and a current coil, said tachometer generators being connected in series with each other and in bucking relation to each other and the voltage coil of the wattmeter being connected in series with the series connected generators, whereby said voltage coil of the wattmeter is energized proportional to the speed difference of said two shafts, a source of direct current connected to the current coil of the wattmeter, voltage regulating means for varying the voltage of the source of direct current, said voltage regulating means having an actuating coil connected to one of said generators, said actuating coil being connected to produce an effect on the voltage regulator to vary the current in the current coil of the wattmeter in inverse relation to the variations in voltage of the generator connected to the coil of the voltage regulator, whereby said wattmeter indicates the speed of one shaft in relation to the speed of the other shaft.

4. In a slip indicator for indicating the speed of one shaft in relation to the speed of another shaft, in combination, a rotating shaft, a second rotating shaft, means for producing a voltage that is directly proportional to the speed difference between the shafts, means, including part of said first-named means, for producing a voltage that is inversely proportional to the speed of the first rotating shaft, and indicating means energized by both these voltages and responsive to the product of said voltages to thus indicate the slip speed of the second shaft with reference to the speed of the first shaft.

5. In a scheme for determining the slip speed of one rotating shaft with reference to the speed of another rotating shaft, in combination, a conventional wattmeter, having a voltage coil and a current coil, for indicating volts times amperes, a rotating shaft, a second rotating shaft, voltage generating means, operated by said shafts, for generating a voltage that is directly proportional to the speed difference between the shafts and is substantially independent of the actual speeds of the shafts, current producing means, including a portion of said voltage generating means, for producing a current that varies inversely with the speed of the second shaft, circuit means for connecting the voltage coil of the wattmeter to the output voltage of the voltage generating means, second circuit means for connecting the current coil of the wattmeter to the output current of the current producing means, whereby said wattmeter indication is a function of the speed difference between the shaft in relation to the speed of the second shaft.

6. In a system for indicating the slip of one rotating shaft with reference to the rotation of another shaft, in combination, a rotating shaft, a second rotating shaft, a generator of the type having a substantially straight line speed-voltage characteristic coupled to one shaft to thus generate a voltage that is directly proportional to the speed of that shaft, a second generator, in every respect like the first generator, coupled to the second shaft to thus generate a voltage that is directly proportional to the speed of said second shaft, a wattmeter having a voltage coil and a current coil, a series circuit including the two generators, connected in bucking relation, and the voltage coil of the wattmeter, whereby said voltage coil is energized directly proportionally to the speed difference between the two shafts, and means for energizing the current coil of the wattmeter inversely to the voltage output of the generator coupled to the first shaft, whereby said wattmeter indicates the slip speed of the second shaft with reference to the speed of the first shaft.

7. In a system for indicating the slip of one rotating shaft with reference to the rotation of another shaft, in combination, a rotating shaft, a second rotating shaft, a generator of the type having a substantially straight line speed-voltage characteristic coupled to one shaft to thus generate a voltage that is directly proportional to the speed of that shaft, a second generator, in every respect like the first generator, coupled to the second shaft to thus generate a voltage that is directly proportional to the speed of said second shaft, a wattmeter having a voltage coil and a current coil, a series circuit including the two generators, connected in bucking relation, and the voltage coil of the wattmeter, whereby said voltage coil is energized directly proportionally to the speed difference between the two shafts, a source of current, having an output circuit connected to the current coil of the wattmeter, regulating means operated by the voltage of the generator coupled to the first shaft for regulating the source of current so that the product of the output current thereof flowing in the current coil of the wattmeter and the voltage of the generator coupled to the first shaft is a constant.

SAMUEL A. HAVERSTICK.